United States Patent

Hoots et al.

Patent Number: 4,752,443
Date of Patent: Jun. 21, 1988

[54] COOLING WATER CORROSION INHIBITION METHOD

[75] Inventors: John E. Hoots; Donald A. Johnson; Dodd W. Fong, all of Naperville; James F. Kneller, LaGrange, all of Ill.

[73] Assignee: Nalco Chemical Company, Naperville, Ill.

[21] Appl. No.: 861,763

[22] Filed: May 9, 1986

[51] Int. Cl.[4] .................. C23F 11/167; C23F 11/173; C23F 11/18; C02F 5/14

[52] U.S. Cl. ..................................... 422/13; 252/179; 252/180; 252/181; 252/387; 252/389.2; 252/389.23; 210/697; 524/123; 524/417; 524/547; 525/329.8; 422/14; 422/15; 422/16

[58] Field of Search ........................ 422/7, 14, 15, 16; 252/180, 179, 181, 389.2, 389.23, 387; 210/697; 524/123, 132, 130, 417, 547; 525/329.8

[56] References Cited

U.S. PATENT DOCUMENTS

| | | |
|---|---|---|
| 3,332,904 | 7/1967 | Lacombe et al. |
| 3,692,673 | 9/1972 | Hoke. |
| 3,898,037 | 8/1975 | Lange et al. ................ 252/389.62 |
| 3,992,318 | 11/1976 | Gaupp et al. ................ 252/389.2 |
| 4,159,922 | 7/1979 | Cosper. |
| 4,277,359 | 7/1981 | Lipinski ........................ 252/181 |
| 4,288,327 | 8/1981 | Godlewski et al. |
| 4,303,568 | 12/1981 | May et al. |
| 4,317,744 | 3/1982 | Levi ............................ 252/389.22 |
| 4,324,684 | 4/1982 | Geiger et al. |
| 4,328,180 | 5/1982 | Hansen ....................... 252/389.2 |
| 4,384,979 | 5/1983 | Hansen ....................... 422/16 |
| 4,443,340 | 4/1984 | May et al. |
| 4,536,292 | 8/1985 | Matz ............................ 252/180 |
| 4,547,540 | 10/1985 | Yeoman. |
| 4,575,425 | 3/1986 | Boffardi et al. .............. 252/180 |
| 4,640,793 | 2/1987 | Persinski et al. ............ 252/82 |
| 4,650,591 | 3/1987 | Boothe et al. ................ 422/15 |
| 4,659,482 | 4/1987 | Chen ........................... 422/15 |

*Primary Examiner*—Herbert Lilling
*Attorney, Agent, or Firm*—John G. Premo; Anthony L. Cupoli; Donald G. Epple

[57] ABSTRACT

A method for inhibiting corrosion in industrial cooling waters which contain hardness and a pH of at least 6.5, by dosing the water with a composition which comprises a water-soluble inorganic phosphate capable of inhibiting corrosion in an aqueous alkaline environment and a hydrocarbon polymer containing an N-substituted acrylamide polymers with an amide structure as follows:

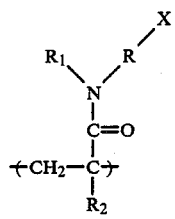

where $R_2$ is hydrogen or methyl, $R_1$ is a hydrogen or an alkyl and R is alkylene or phenylene, and X is sulfonate, (poly)hydroxyl, (poly)carboxyl or carbonyl, and combinations thereof; or containing derivatized maleic anhydride homo-, co- and terpolymers having N-substituted maleamic acid units, N-substituted maleimide units and maleic acid (and salts) units having a structure as follows:

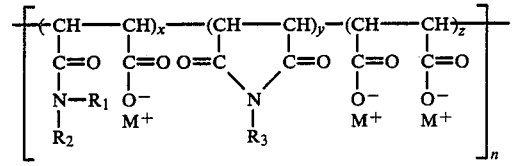

where $R_1$, $R_2$ and $R_3$ are each independently chosen from the group consisting of hydrogen, hydroxyl, carboxyalkyl, carboxyamide, phenyl, substituted phenyl, linear or branched alkyl of from one to ten carbon atoms, and substituted alkyl of from one to ten carbon atoms, where the substituent is phosphonic acid; phosphinic acid; phosphate ester; sulfonic acid; sulfate ester, carboxyamide, (poly)carboxy and (poly)hydroxy, alkoxy and carboxylate ester groups; and combinations thereof.

6 Claims, No Drawings

COOLING WATER CORROSION INHIBITION METHOD

INTRODUCTION

This invention is related to the preparation of corrosion inhibiting formulations containing inorganic phosphates or combinations of inorganic phosphates and phosphonates and novel, derivatized polymers. In subsequent discussion and claims, concentrations of polymers, phosphonates, phosphates, azoles and combinations thereof are listed as actives on a weight basis unless otherwise specified.

BACKGROUND OF THE INVENTION

Corrosion occurs when metals are oxidized to their respective ions and/or insoluble salts. For example, corrosion of metallic iron can involve conversion to soluble iron in a +2 or +3 oxidation state or insoluble iron oxides and hydroxides. Also, corrosion has a dual nature in that a portion of the metal surface is removed, while the formation of insoluble salts contribute to the buildup of deposits. Losses of metal cause deterioration of the structural integrity of the system. Eventually leakage between the water system and process streams can occur.

Corrosion of iron in oxygenated waters is known to occur by the following coupled electrochemical processes:

1. $Fe^0 \rightarrow Fe^{+2} + 2e^-$ (Anodic Reaction)
2. $O_2 + 2e^- \rightarrow 2OH^-$ (Cathodic Reaction)

Inhibition of metal corrosion by oxygenated waters typically involves the formation of protective barriers on the metal surface. These barriers prevent oxygen from reaching the metal surface and causing metal oxidation. In order to function as a corrosion inhibitor, a chemical additive must facilitate this process such that an oxygen-impermeable barrier is formed and maintained. This can be done by interaction with either the cathodic or anodic half-cell reaction.

Inhibitors can interact with the anodic reaction (1) by causing the resultant $Fe^{+2}$ to form an impermeable barrier, stifling further corrosion. This can be accomplished by including ingredients in the inhibitor compound which:

React directly with $Fe^{+2}$ causing it to precipitate;
Facilitate the oxidation of $Fe^{+2}$ to $Fe^{+3}$, compounds of which are typically less soluble; or,
Promote the formation of insoluble $Fe^{+3}$ compounds, The reduction of oxygen at corrosion cathodes provides another means by which inhibitors can act. Reaction 2 represents the half cell in which oxygen is reduced during the corrosion process. The product of this reaction is the hydroxyl ($OH^-$) ion. Because of this production of hydroxyl, the pH at the surface of metals undergoing oxygen mediated corrosion is generally much higher than that of the surrounding medium. Many compounds are less soluble at elevated pH's. These compounds can precipitate at corrosion cathodes and act as effective inhibitors of corrosion if their precipitated form is impervious to oxygen and is electrically nonconductive.

PRIOR ART

The use of inorganic phosphates and phosphonates in conjunction with a threaded inhibitor in order to control corrosion by oxygenated waters is described by U.S. Pat. No. 4,303,568. This method is further elaborated by U.S. Pat. No. 4,443,340 which teaches that a composition comprised of only inorganic phosphates and a polymeric inhibitor gives superior performance in the presence of dissolved iron.

SUMMARY OF THE INVENTION

The current invention describes corrosion inhibiting compounds consisting of inorganic phosphates, optionally phosphonates, optionally aromatic azoles and a unique series of derivatized polymers. The use of these polymers results in significantly improved corrosion inhibition performance. These polymers are copolymers and terpolymers that have been prepared by post-polymerization derivatization.

THE DERIVATIZED POLYMERS

The polymers of this invention have been prepared by post-polymerization derivatization. The derivatizing agents of the invention are hydrocarbon groups containing both an amino functionality and at least one of the following groups:

(1) (poly)hydroxy alkyl(aryl);
(2) alkyl and aryl(poly)carboxylic acids and ester analogues;
(3) aminoalkyl(aryl) and quaternized amine analogues;
(4) halogenated alkyl(aryl);
(5) (poly)ether alkyl(aryl);
(6) (di)alkyl;
(7) alkyl phosphonic acid;
(8) alkyl keto carboxylic acid;
(9) hydroxyalkyl sulfonic acid; and
(10) (aryl)alkyl sulfonic acid, wherein the prefix "poly" refers to two or more such functionalities.

The derivatization process of the invention includes direct amidation of polyalkyl carboxylic acids and transamidation of copolymers containing carboxylic acid and (meth)acrylamide units.

For purposes of this invention the term "acryl" includes the term "methacryl".

Particularly advantageous are polymers of the present invention which contain sulfomethylamide- (AMS), sulfoethylamide- (AES), sulfophenylamide- (APS), 2-hydroxy-3-sulfopropylamide- (HAPS) and 2,3-dihydroxypropylamide-units which are produced by transamidation using acrylamide homopolymers and copolymers, including terpolymers, which have a mole percent of acrylamide or homologous unit of at least about 10%. The transamidation is achieved using such reactants as aminomethanesulfonic acid, 2-aminoethanesulfonic acid (taurine), 4-aminobenzenesulfonic acid (p-sulfanilic acid), 1-amino-2-hydroxy-3-propanesulfonic acid, or 2,3-dihydroxypropylamine in aqueous or like polar media at temperatures on the order of about 150° C. Once initiated, the reactions go essentially to completion.

Other particularly advantageous polymeric sulfonates of the present invention are produced by an addition reaction between an aminosulfonic acid, such as sulfanilic acid, and taurine, or their sodium salts, and a copolymer of maleic anhydride and a vinylic compound such as styrene, methyl, vinyl ether, or (meth)acylamide.

DETAILED DESCRIPTION OF THE INVENTION

It has been found that the post-polymerization derivatized hydrocarbon polymers of the invention can be used in conjunction with phosphates and/or phosphonates to provide very effective corrosion inhibiting formulations for cooling water, boiler water, industrial and petroleum process water, and oil well drilling water. Testing results set forth hereinafter show these materials very effectively enhance the corrosion inhibition of phosphates and/or phosphonates. Eminently useful compounds according to the invention include:

(1) N-substituted amide polymers containing an amide structure as follows:

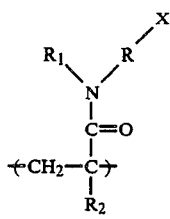

where $R_2$ is hydrogen or methyl, $R_1$ is hydrogen or alkyl and R is alkylene or phenylene, and X is sulfonate, (poly)hydroxyl, (poly)carboxyl or carbonyl and combinations thereof; and (2) derivatized maleic anhydride homo-, co- and terpolymers having N-substituted maleamic acid units, N-substituted maleimide units and maleic acid (and salts) units having a structure as follows:

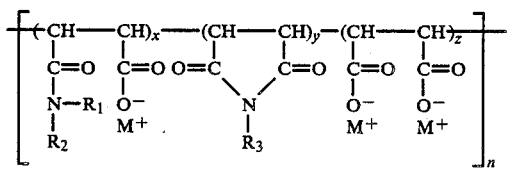

where $R_1$, $R_2$ and $R_3$ are each independently chosen from the group consisting of hydrogen, hydroxyl, carboxyalkyl, carboxyamide, phenyl, substituted phenyl, linear and branched alkyl of from one to ten carbon atoms, and substituted alkyl of from one to ten carbon atoms, where the substituent may be (poly)hydroxyl; carbonyl; sulfonic acid, sulfate ester; alkoxy, carboxylate ester; carboxyamide and (poly)carboxylic groups; and combinations thereof; and $M^+$ may be $H^+$, alkali metal ions, alkaline earth metal ions, ammonium ions and wherein:

n = total modes of derivatized and underderivatized maleic units in the polymer and is an integer in the range from 10 to about 1200 x = mole fraction of maleamic acid (salt) units in the polymer and can vary from 0 to about 1.0 y = mole fractions of maleimide units in the polymer and can vary from 0 to about 0.95 z = mole fraction of maleic acid (salts) units in the polymer and can vary from 0 to about 0.95 x+y+z=1

Some Acrylic Acid/Acrylamide Derivatized Species

Although the compositions are more fully described in the Tables to come some specific species which fall within the scope of this invention include acrylic acid-/acrylamide polymers which have been derivatized.

Of particular interest are these polymers which have been derivatized to include sulfomethyl acrylamide. These polymers preferably have a molecular weight within the range of 7,000 to 82,000 and a mole ratio within the range AA(13-95)/Am(0-73)/AMS (5-41). A more preferred composition of the same species would have Mw within the range of 10,000 to 40,000, and a mole ratio within the range AA(40-90)/Am(0-50-)/AMS(10-40).

The species derivatized to include 2-sulfoethyl acylamide with a molecular weight, within the range of 6,000 to 56,000, and a mole ratio within the range AA(1-9-95)/Am(0-54)-AES(5-58) is also a preferred species of the invention.

A more preferred species contains 2-sulfoethyl acrylamide with a Mw within the range of 10,000 to 40,000 and a mole ratio within the range AA(40-90)/Am(-0-50)/2-AES(10-40).

The polymer containing sulfoethyl acrylamide and having a Mw within the range of 5,000 to 80,000 and a mole ratio within the range of AA(20-95)/Am(0-50)-/sulfophenyl acrylamide (5-70) is also a preferred species of the invention. A more preferred species utilizes a sulfophenyl amine derivatizing agent with a Mw within the range of 10,000 to 40,000; a mole ratio within the range AA(40-90)/Am(0-50)/sulfophenyl acrylamide (10-40).

The polymer containing 2-hydroxy-3-sulfopropyl acrylamide and having a Mw within the range of 11,000 to 69,000 and a mole ratio within the range AA(20-95-)/Am(0-50)/HAPS(5-70) is also preferred. A more preferred species using this derivatizing agent has a Mw within the range of 10,000 to 40,000 and a mole ratio within the range AA(40-90)Am(0-50)/HAPS(10-40).

Another preferred species is the polymer containing N-(2-methyl-1,3-dihydroxy)propylacrylamide and having a Mw within the range of 5,000 to 80,000 and a mole ratio within the range AA(20-95)/Am(0-50)/N-(2-methyl-1,3-dihydroxy)propylacrylamide (5-70). A more preferred species using this derivatizing agent has a Mw within the range of 10,000 to 40,000 and a mole ratio within the range AA(40-90)/Am(0-50)/N-(2-methyl-1,3-dihydroxy)propylacrylamide 10-40).

Another preferred species is the polymer containing N-(2,3-dihydroxy)propylacrylamide and having a Mw within the range of 5,000 to 80,000 and a mole ratio within the range AA(20-95)/Am(0-50)/N-(2,3-dihydroxy)propylacrylamide (5-70). A more preferred species using this derivatizing agent has a Mw within the range of 10,000 to 40,000 and a mole ratio within the range AA(40-90)Am(0-50)/N-(2,3-dihydroxy)propylacrylamide (10-40).

Another preferred species is the derivatized polymer including tris-(hydroxy methyl)methyl acrylamide having a Mw within the range of 5,000 to 80,000 and a mole ratio within the range AA(20-95)/Am(0-50)/tris-(hydroxy methyl)methyl acrylamide (5-70). A more preferred species including that derivatized mer unit has a Mw within the range of 10,000 to 40,000 and a mole ratio within the range AA(40-90)/Am(0-50)/tris-(hydroxy methyl)methyl acrylamide (10-40).

Another preferred species is the polymer derivatized with carboxypentyl acrylamide having a Mw within the range of 5,000 to 80,000 and a mole ratio within the range AA(20-95)/Am(0-50)/carboxypentyl acrylamide (5-70). A more preferred species using this derivatizing agent has a Mw within the range of 10,000 to 40,000 and a mole ratio within the range AA(40-90-)/Am(0-50)/carboxypentyl acrylamide (10-40).

Another preferred species is the polymer derivatized with N-(1,2-dicarboxy)ethyl acrylamide having a Mw within the range of 5,000 to 80,000 and a mole ratio within the range AA(20-95)/Am(0-50)/N-(1,2-carboxy)ethyl acrylamide (5-70). A more preferred species using this derivatizing agent has a Mw within the range of 10,000 to 40,000 and a mole ratio within the range AA(40-90)/Am(0-50)/N-(1,2-dicarboxy)ethyl acrylamide (10-40).

Some Derivatized Species of the Invention Having N-substituted Maleic Units

The invention also includes polymers containing a maleic anhydride backbone which have been derivatized. Some of the preferred species includes a derivatized backbone containing N-substituted maleimic acid units, N-substituted maleamic units or maleic acid units. Additionally, the backbone may include other mer comonomers "V".

Preferred species include a hydrocarbon polymer having comonomer "V"=alkyl vinyl ether (alkyl=-C$_1$-C$_4$) and having a Mw within the range of from 3,000-100,000 where the derivatizing agent is taurine or salts thereof and a mole ratio of taurate to n (where n=total moles of derivatized and underivatized maleic units in the polymer) ranges from 0.2:1 to 1:1.

Another preferred species is the comonomer "V"=alkyl vinyl ether (alkyl=C$_1$-C$_4$) where the derivatizing agent is aminoaryl sulfonic acid or salts thereof; and Mw is within the range of 3,000-100,000.

Another preferred species has the comonomer in the backbone "V"=alkyl vinyl ether (C$_1$-C$_4$); and is derivatized with 4-aminophenyl sulfonic acid and Mw within the range of from 3,000-100,000.

Another preferred species has comonomer "V"=to alkyl vinyl ether (C$_1$-C$_4$); and is derivatized with 4-aminophenol and a Mw within the range of from 3,000-100,000.

Another preferred species has a comonomer "V"=alkyl vinyl ether (alkyl=C$_1$-C$_4$); and is derivatized with mono or dialkyl amine (alkyl=C$_1$-C$_4$) and Mw within the range of from 3,000-100,000.

Another preferred species includes a component "V"=alkylene (C$_2$-C$_6$); and is derivatized with taurine or taurine salt with the mole ratio of taurate to n within the range of from 0.2:1 to 1:1, and a Mw within the range of from 3,000-40,000.

Another preferred species includes a comonomer "V"=styrene; and is derivatized with amino phenyl sulfonic acid and a Mw within the range of from 3,000-20,000.

Another preferred species include comonomer "V"=sulfonated styrene; and is derivatized with amino phenyl sulfonic acid and a Mw within the range of 3,000-20,000.

Another preferred species includes comonomer "V"=(meth)acrylamide; a taurine derivatizing agent with a mole ratio of taurate to N within the range of from 0.5:1 to 1:1 and a Mw within the range of 3,000-20,000.

Generally the mole ratio of V to N falls within the range of from 3:1 to 1:3. More preferably the ratio falls within the range of 1.5:1 to 1:1.5.

The Phosphonates

Generally any water-soluble phosphonates may be used that is capable of providing corrosion inhibition in alkaline systems. See U.S. Pat. No. 4,303,568 which lists a number of representative phosphonates. The disclosure is incorporated herein by reference.

The organo-phosphonic acid compounds are those having a carbon to phosphorus bond, i.e.,

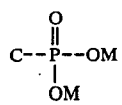

Compounds within the scope of the above description generally are included in one of perhaps 3 categories which are respectively expressed by the following general formulas:

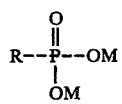

where R is lower alkyl having from about one to six carbon atoms, e.g., methyl, ethyl, butyl, propyl, isopropyl, pentyl, isopentyl and hexyl; substituted lower alkyl of from one to six carbon atoms, e.g., hydroxyl and amino-substituted alkyls; a mononuclear aromatic (aryl) radical, e.g., phenyl, benzene, etc., or a substituted mononuclear aromatic compound, e.g., hydroxyl, amino, lower alkyl substituted aromatic, e.g., benzyl, phosphonic acid; and M is a water-soluble cation, e.g., sodium, potassium, ammonium, lithium, etc. or hydrogen.

Specific examples of compounds which are encompassed by this formula include:

methylphosphonic acid

CH$_3$PO$_3$H$_2$ ethylphosphonic acid

CH$_3$CH$_2$PO$_3$H$_2$ 2-hydroxyethylphosphonic acid

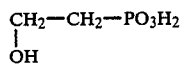

2-amino-ethylphosphonic acid

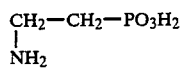

isopropylphosphonic acid

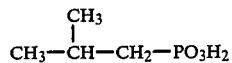

benzene phosphonic acid

C$_6$H$_5$—PO$_3$H$_2$ benzylphosphonic acid

C$_6$H$_5$CH$_2$PO$_3$H$_2$

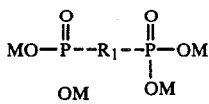

wherein $R_1$ is an alkylene having from about one to about 12 carbon atoms or a substituted alkylene having from about 1 to about 12 carbon atoms, e.g., hydroxyl, amino etc. substituted alkylenes, and M is as earlier defined above.

Specific exemplary compounds and their respective formulas which are encompassed by the above formula are as follows:

methylene diphosphonic acid $$H_2O_3P-CH_2-PO_3H_2$$

ethylidene diphosphonic acid $$H_2O_3P-CH(CH_3)PO_3H_2$$

isopropylidene diphosphonic acid $$(CH_3)_2C(PO_3H_2)_2$$

1-hydroxy, ethylidene diphosphonic acid (HEDP)

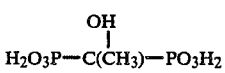

hexamethylene diphosphonic acid $$H_2O_3P-CH_2(CH_2)_4CH_2-PO_3H_2$$

trimethylene diphosphonic acid $$H_2O_3P-(CH_2)_3-PO_3H_2$$

decamethylene diphosphonic acid $$H_2O_3P-(CH_2)_{10}-PO_3H_2$$

1-hydroxy, propylidene diphosphonic acid $$H_2O_3PC(OH)CH_2(CH_3)PO_3H_2$$

1,6-dihydroxy, 1,6-dimethyl, hexamethylene diphosphonic acid $$H_2O_3PC(CH_3)(OH)(CH_2)_4C(CH_3)(OH)PO_3H_2$$

dihydroxy, diethyl ethylene diphosphonic acid $$H_2O_3PC(OH)(C_2H_5)C(OH)(C_2H_5)PO_3H_2$$

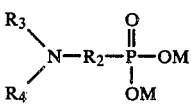

where $R_2$ is a lower alkylene having from about one to about four carbon atoms, or an amine or hydroxy substituted lower alkylene; $R_3$ is $[R_2PO_3M_2]$ H, OH, amino, substituted amino, an alkyl having from one to six carbon atoms, a substituted alkyl of from one to six carbon atoms (e.g., OH, $NH_2$ substituted) a mononuclear aromatic radical and a substituted mononuclear aromatic radical (e.g., OH, $NH_2$ substituted); $R_4$ is $R_3$ or the group represented by the formula

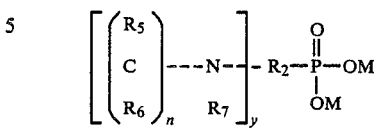

where $R_5$ and $R_6$ are each hydrogen, lower alkyl of from about one to six carbon atoms, a substituted lower alkyl (e.g., OH, $NH_2$ substituted), hydrogen, hydroxyl, amino group, substituted amino group, a mononuclear aromatic radical, and a substituted mononuclear aromatic radical (e.g., OH and amine substituted); R is $R_5$, $R_6$, or the group $R_2-PO_3M_2$ ($R_2$ is as defined above); n is a number of from 1 through about 15; y is a number of from about 1 through about 14; and M is as earlier defined.

Compounds or formulas therefore which can be considered exemplary for the above formulas are as follows:

nitrolo-tri(methylene phosphonic acid)

$$N(CH_2PO_3H_2)_3$$

imino-di(methylene phosphonic acid)

$$NH(CH_2PO_3H_2)_2$$

n-butyl-amino-di(methyl phosphonic acid)

$$C_4H_9N(CH_2PO_3H_2)_2$$

decyl-amino-di(methyl phosphonic acid)

$$C_{10}H_{21}N(CH_2PO_3H_2)_2$$

trisodium-pentadecyl-amino-di-methyl phosphate $$C_{15}H_{31}N(CH_2PO_3HNa)(CH_2PO_3Na_2)$$

n-butyl-amino-di(ethyl phosphonic acid)

$$C_4H_9N(CH_2CH_2PO_3H_2)_2$$

tetrasodium-n-butyl-amino-di(methyl phosphate)

$$C_4H_9N(CH_2PO_3Na_2)_2$$

triammonium tetradecyl-amino-di(methyl phosphate)

$$C_{14}H_{29}N(CH_2PO_3(NH_4)_2)CH_2PO_3HNH_4$$

phenyl-amino-di(methyl phosphonic acid)

$$C_6H_5N(CH_2PO_3H_2)_2$$

4-hydroxy-phenyl-amino-di(methyl phosphonic acid)

$$HOC_6H_4N(CH_2PO_3H_2)_2$$

phenyl propyl amino-di(methyl phosphonic acid)

$$C_6H_5(CH_2)_3N(CH_2PO_3H_2)_2$$

tetrasodium phenyl ethyl amino-di(methyl phosphonic acid)

$C_6H_5(CH_2)_2N(CH_2PO_3Na_2)_2$ ethylene diamine tetra(methyl phosphonic acid)

$(H_2O_3PCH_2)_2N(CH_2)_2N(CH_2PO_3H_2)_2$ trimethylene diamine tetra(methyl phosphonic acid)

$(H_2O_3PCH_2)_2N(CH_2)_3N(CH_2PO_3H_2)_2$ hepta methylene diamine tetra(methyl phosphonic acid)

$(H_2O_3PCH_2)_2N(CH_2)_7N(CH_2PO_3H_2)_2$ decamethylene diamine tetra(methyl phosphonic acid)

$(H_2O_3PCH_2)_2N(CH_2)_{10}N(CH_2PO_3H_2)_2$ tetradecamethylene diamine tetra(methyl phosphonic acid)

$(H_2O_3PCH_2)_2N(CH_2)_{14}N(CH_2PO_3H_2)_2$ ethylene diamine tri(methyl phosphonic acid)

$(H_2O_3PCH_2)_2N(CH_2)_2NHCH_2PO_3H_2$ ethylene diamine di(methyl phosphonic acid)

$H_2O_3PCH_2)_2NH(CH_2)_2NHCH_2PO_3H_2$ n-hexyl amine di(methyl phosphonic acid)

$C_6H_{13}N(CH_2PO_3H_2)_2$ diethylamine triamine penta(methyl phosphonic acid)

$(H_2O_3PCH_2)_2N(CH_2)_2N(CH_2PO_3H_2)(CH_2)_2N(CH_2PO_3H_2)_2$ ethanol amine di(methyl phosphonic acid)

$HO(CH_2)_2N(CH_2PO_3H_2)_2$ n-hexyl-amino(isopropylidene phosphonic acid)methylphosphonic acid $C_6H_{13}N(C(CH_3)_2PO_3H_2)(CH_2PO_3H_2)$ trihydroxy methyl, methyl amine di(methyl phosphonic acid $(HOCH_2)_3CN(CH_2PO_3H_2)_2$ triethylamine tetra amine hexa(methyl phosphonic acid)

$(H_2O_3PCH_2)_2N(CH_2)_2N(CH_2PO_3H_2)(CH_2)_2N(CH_2PO_3H_2)(CH_2)_2N(CH_2PO_3H_2)_2$ monoethanol, diethylene triamine tri(methyl phosphonic acid $HOCH_2CH_2N(CH_2PO_3H_2)(CH_2)_2NH(CH_2)_2N(CH_2PO_3H_2)_2$ chloroethylene amine di(methyl phosphonic acid)

$ClCH_2CH_2N((CH_2PO(OH)_2)_2$

The above compounds are included for illustration purposes and are not intended to be a complete listing of the compounds which are operable within the confines of the invention.

Preferred phosphonates are the two compounds:
A. 2-phosphonobutane-1,2,4-tricarboxylic acid and
B. 1-hydroxyethane-1,1-diphosphonic acid.

The use of phosphonates is optional. When phosphonates are utilized, the inorganic phosphates (ortho and/or condensed) and phosphonates are combined in a weight ratio of 0.5:1:0.33 to 30:1:16.

In addition to phosphonates, additives such as aromatic azole may be utilized. For example, tolyltriazole is effective in the reduction of copper substrate corrosion.

INORGANIC PHOSPHATES

Inorganic phosphates used in this invention are either the acid form of inorganic phosphate or any of their metal, ammonium or amine salts. The inorganic phosphates (ortho and condensed) of this invention are chosen from the group:
1. Orthophosphate
2. Pyrophosphate
3. Tripolyphosphate
4. Hexametaphosphate
5. Higher molecular weight polyphosphate oligomers Any of the above inorganic phosphates may be used alone or in combination. However, orthophosphate is preferred. More preferably, a combination of orthophosphate and one of the other inorganic phosphates will be utilized.

COMPOSITION

The corrosion inhibitor compositions of the invention are added to an aqueous system such that the total active ingredients are at the following concentrations:
1. General—10 to 100 mg/liter (ppm)
2. Preferred—10 to 50 mg/liter (ppm)
3. Most preferred—15 to 40 mg/liter (ppm)

The inorganic phosphate portion of the composition consists of the previously defined group of inorganic phosphates or combinations thereof. The most preferred inorganic phosphates are orthophosphate and pyrophosphate. These components comprise a certain percentage of the composition of the invention:
1. General—4% to 80%
2. Preferred—20 to 75%
3. Most preferred—40 to 70%

Based on the composition of water being treated, it may be desirable to vary the ratio of orthophosphate to condensed phosphate. Desired ranges of this ratio (on active basis) are:
1. General—0.5:1 to 30:1.
2. Preferred—0.5:1 to 10:1.
3. Most preferred—1:1 to 4:1

It is also desirable to include an organic phosphonate in the composition, particularly at elevated pH and alkalinity levels. The previous enumeration of phosphonates gives many examples of suitable ingredients. Particularly preferred phosphonates are:
1. 1,1 hyddroxyethylidine diphosphonic acid and its salts 2. 2-Phosphono butane 1,2,4-tricarboxylic acid and its salts Desired ranges of orthophosphate, condensed phosphate and phosphonate are:
1. General—0.5:1:0.33 to 30:1:16; (i.e. 0.5–30:1:0.33–16)
2. Preferred—0.5:1:1 to 10:1:10
3. Most preferred—1:1:1 to 4:1:6

Where phosphonate is used desired ranges of inorganic phosphate to phosphonate are:
1. General—1.5:1.0 to 90:48; (i.e. 1.5–90:1.0–48)
2. Preferred—1.2:1 to 30:30
3. Most preferred—1:1 to 4:6

The aqueous systems to be dosed will generally have a pH within the range of 6.5 to 9.2. Preferably the pH will be in the range of 7 to 8.5.

EXAMPLES OF POLYMER PREPARATION

In order to describe the instant species of the derivatized polymers of this invention more fully, the following working examples are given.

Examples 1–3 describe N-substituted amide polymers, while Example 4 described sulfonated maleic anhydride terpolymer. Molecular weights herein are determined by aqueous gel permeation chromatography using polystyrene sulfonic acid standards.

N-Substituted Amide Polymer Species

EXAMPLE 1

A mixture of poly(acrylamide [50 mole %]-acrylic acid) (150 g of 31.5% solution in water; Mw 55,700); taurine (16.7 g); and sodium hydroxide (10.6 g 50% solution in water) was heated in a mini Parr pressure reactor at 150° C. for four hours. The reaction mixture was then cooled to room temperature. The molecular weight of the resulting polymer, determined by GPC using polystyrene sulfonate standard, was 56,000. The composition of the polymer was determined both by C-13 NMR and colloid titration and was found to contain about 50% carboxylate, 31% primary amide and 19% sulfoethylamide.

EXAMPLE 2

A mixture of poly(acrylamide [75 mole%]-acrylic acid) (150 g of 27.5% solution in water); sulfanilic acid (20.4 g); sodium hydroxide (9.3 g of 50% solution); and 10.5 g of water was heated in a mini Parr pressure reactor at 150° C. for five hours. The reaction mixture was thereafter cooled to room temperature. The weight average molecular weight (Mw) of the resulting polymer was 11,500 as determined by GPC using polystyrene sulfonate standard. The polymer contained about 5% sulfophenylamide, 47.5% primary amide and 47.5% carboxylate as estimated by C-13 NMR.

EXAMPLE 3

A mixture of poly(acrylamide [75 mole%]-acrylic acid) (150 g of 27.5% solution in water); aminomethane sulfonic acid (13.2 g); and sodium hydroxide (10.2 g of 50% solution) was heated in a mini Parr pressure reactor at 125° C. for four-and-a-half hours. The reaction mixture was thereafter cooled to room temperature. The molecular weight of the resulting polymer was 15,900 as determined by GPC using polystyrene sulfonate standard. The polymer contained about 45% acrylic acid, 40% acrylamide and 15% sulfomethylacrylamide as estimated by C-13 NMR.

Sulfonated Maleic Anhydride Polymer Species

This aspect of the post-modification procedure of the invention calls for the addition reaction of a selected amino-sulfonic acid, or its alkali metal salt, and maleic anhydride homopolymer, copolymer or terpolymer of maleic anhydride and vinylic compounds.

The present reaction is caused to take place in a suitable solvent, such as dimethylformamide, under heating agitation and reflux conditions; and preferred aminosulfonate sources include 4-aminobenzenesulfonic acid (p-sulfanilic acid), 2-aminoethanesulfonic acid (taurine), and the alkali metal salts thereof. 3-Aminobenzenesulfonic acid (metanilic acid) and its alkali metal salts may also be employed.

The copolymers, including terpolymers, which find utility in the present species of the invention are made up of maleic anhydride and like ring compounds which have been reacted with suitable monomers such as styrene, methyl vinyl ether, N-vinylpyrrolidone, N-vinylcaprolactam and N-methyl-N-vinyl-acetamide, (meth)acrylamide, (meth)acrylic acid, (meth)acrylate esters, vinyl esters such as vinyl acetate, alkenes such as 1-hexene, 1-butene and dienes such as butadiene and cyclopentadiene, for example.

The maleic anhydride homo-, co- and terpolymers are reacted with from 5 to 100 mole % of the organoaminosulfonate compound per mole of anhydride group in the polymer. The molecular weight of the resulting polymers have a weight average molecular weight in the range of from about 1000 to about 120,000 and preferably from about 3000 to 100,000 as determined by gel permeation chromatography.

In order to describe this aspect of the invention more fully, the following working example is given:

EXAMPLE 4

To a reaction flask fitted with a reflux condenser, mechanical stirrer, nitrogen sparging tube and a thermometer, there was added 15.6 g (0.1 mole) of Gantrez AN-149 (Gantrez is a trademark of GAF for a 1:1 mole ratio copolymer of maleic anhydride and methyl vinyl ether) and 200 g of dimethylformamide solvent. The resultant mixture was heated under a nitrogen gas atmosphere to dissolve the polymer. A highly colored solution, red-violet in hue, resulted. After all the polymer was dissolved, at a temperature of about 120° C., 21.3 g (0.1 mole) of sodium sulfanilate monohydrate was added to the reaction flask together with a further 100 g of dimethylformamide.

Heating was continued until the solution refluxed, at a temperature of about 144°–148° C.; and refluxing was continued for four hours. During this time, an intense blue-purple color developed and solids precipitated. After refluxing was completed, the entire reaction mixture (precipitate and solvent solution) was concentrated on a rotary evaporator under vacuum. A dark blue solid resulted, and this was subject to final drying in a vacuum oven at 50° C. for 24 hours. A very dark colored solid, 35 g in weight, remained. This solid was dissolved easily in water with the addition of a small amount of sodium hydroxide to give a solution of deep blue color.

The molecular weight of the resultant polymer was estimated to be 95,400 by GPC using polystyrene sulfonate standard and its infra-red spectrum showed absorptions at 1770 $cm^{-1}$ (cyclic imide), 1700 $cm^{-1}$ (cyclic imide and carboxyl), 1650 $cm^{-1}$ (amide carbonyl), 1590 $cm^{-1}$ (carboxylate) and 1560 $cm^{-1}$ (amide II band).

The polymer contained about about 81 mole % maleimide units, about 14 mole % maleic acid units and about 5 mole % maleamic acid units as estimated by infra-red and LC analysis for residual organoaminosulfonate compound.

CORROSION INHIBITING FORMULATIONS

In order to describe the corrosion inhibiting examples of this invention the following examples of corrosion inhibiting formulations are given:

Formulation Examples

EXAMPLE 5

A diluted solution of the polymer was prepared by adding 79 grams of softened water to a glass or stainless steel container. With stirring, 21 grams of acrylic acid-/acrylamide/sulfomethyl acrylamide terpolymer (Sample $E_2$, 35.8 weight percent) were added and the resulting solution contained 7.5 weight percent polymer actives. Other co- (ter)polymers containing derivatized acrylamide or maleic anhydride units can be substituted for the sulfomethylacrylamide containing polymer described above. An increase or decrease in the polymer actives level was accomplished by corresponding changes in the amount of polymer and softened water. Corrosion inhibitors can be included with polymer solutions. For example, polymer and aromatic azole combinations may be prepared with sufficient aqueous sodium hydroxide added to attain final pH 12.5 to 13.

EXAMPLE 6

To a glass or stainless steel container was added 15 grams of softened water. With stirring, aqueous solutions of the following materials were added consecutively:
15.8 grams of acrylic acid/ethyl acrylate copolymer (AA/EA)
8.5 grams of acrylic acid/acrylamide copolymer (AA/Am)
13.5 grams of acrylic acid/acrylamide/sulfoethylacrylamide
terpolymer (i.e. polymer sample $C_6$, AA/Am/AES)

The mixture was cooled in an ice-bath and then basified by slow addition of approximately 4.5 grams of aqueous potassium hydroxide (45 weight percent) to the vigorously stirred solution. During the addition of base, the solution's temperature was maintained below 120° F. The pH of the mixture was adjusted to 5.5–6.0 and the solution diluted to 50 grams total weight using softened water. The cooling bath was removed and the solution stirred until ambient temperature was attained. The final solution respectively contains 7.5, 4,7, and 9.4 weight percent actives of AA/EA, AA/Am, and AA/Am/AES.

Changes in the formulation are easily accommodated by simple modification of the previously listed procedure. Decreasing the amount of polymer(s) and potassium hydroxide, followed by increasing the final amount of water added, will produce a formulation containing less polymer actives. Other derivatized co- (ter)polymers can be substituted for the acrylic acid/acrylamide/sulfoethylacrylamide terpolymer.

EXAMPLE 7

To a glass or stainless steel container was added 7.7 grams of softened water. The sample was cooled in an ice-bath and 43 grams of aqueous potassium hydroxide (45 weight percent) was added. The solution temperature was maintained below 140° F. during consecutive addition of 11.8 grams of orthophosphoric acid (85 weight percent) and 4 grams of 1-hydroxyethane-1,1-diphosphonic acid (60 weight percent). The mixture was then maintained below 100° F. during addition of 26.5 grams tetrapotassium pyrophosphate (60 weight percent). As needed, the pH was adjusted to be within the range of from 12.5 to 13 using aqueous potassium hydroxide (45 weight percent), and then 7 grams of sodium tolyltriazole (50 weight percent) were added.

Additionally, 2-phosphonobutane-1,2,4-tricarboxylic acid (a/k/a PBTC or PBS/AM) is described in U.S. Pat. No. 3,886,204, hereinafter incorporated by reference. The phosphonates can also be entirely removed, with corresponding changes in aqueous potassium hydroxide and softened water levels.

Concurrent feeding of a single polymer (Example 5) and the formulation containing ortho/pyrophosphate and phosphonate (Example 7) is satisfactory in many applications. The relative amount of each formulation can be varied according to the operating conditions, environmental restrictions, and economics of the individual systems. Under severe conditions, a mixture of polymers (Example 6) and the ortho/pyrophosphate formulation provide additional corrosion inhibition and dispersion of particulates. Depending on the application, formulations consisting of ortho and condensed phosphate, orthophosphate and phosphonate, or condensed phosphate and phosphonate may be utilized.

EXAMPLE 8

Another preferred composition employed analogous procedure for preparation as Example 7, except for changes in component levels as indicated:
8.7 grams of softened water
48 grams of aqueous potassium hydroxide (45 wt%)
14.3 grams of orthophosphonic acid (85 wt%)
4.5 grams of 1-hydroxyethane-1,1-diphosphonic acid (60 wt%)
18 grams of tetrapotassium pyrophosphate (60 wt%)
7 grams of sodium tolyltriazole (50 wt%)

The procedure for mixing of components and pH adjustment was comparable to Example 7.

EXAMPLE 9

Another preferred composition employed combination of polymeric component and corrosion inhibitors into a single solution. The order of addition and amount of component employed are as listed below:
27 grams of softened water
29 grams of aqueous potassium hydroxide (45 wt%)
12.1 grams of polymer sample $C_6$ (34.8 wt%)
7.6 grams of orthophosphoric acid (85 wt%)
2.6 grams of 1-hydroxyethane-1,1-diphosphonic acid (60 wt%)
17 grams of tetrapotassium pyrophosphate (60 wt%)
4.5 grams of sodium tolyltriazole (50 wt%)

The procedure for mixing of components and pH adjustment were comparable to Example 7, except for inclusion of the polymeric materials.

EXAMPLES OF EXPERIMENTAL PROCEDURES

In laboratory tests, hardness cations and M alkalinity are expressed as $CaCO_3$ or cycles of concentration. Ortho and pyrophosphate are lised as $PO_4$ and inhibitors (polymeric and phosphonates) are listed as actives.

The inhibitory power of various polymers has been evaluated using benchtop activity tests and pilot cooling tower trials (PCTs). The general conditions employed in benchtop tests are listed below and those for PCTs are described in Table IV.

Calcium, magnesium, and bicarbonate were respectively supplied by reagent grade $CaCl_2 2H_2O$; $MgSO_4 7H_2O$; and $NaHCO_3$. The inhibitor concentrations used in each test class are indicated in Tables I and II. The orthophosphate was supplied by $H_3PO_4$ and the organophosphorus materials obtained from commercial suppliers. Each test solution was stirred with a teflon coated stir bar in a jacketed glass beaker. Temperature was maintained using a Lauda recirculating, constant-temperature bath. The pH was determined with Fisher Accumet meter (Model 610A) and a combination electrode. The pH meter was calibrated with two standard buffers (pH 7 and 10) and corrections were made for temperature changes.

By increasing the availability of phosphorus-based corrosion inhibitors, the polymeric component serves a vital role in providing enhanced corrosion protection when used in conjunction with phosphates ad phosphonates. Stabilization and inhibition of low solubility salts of phosphates and phosphonates is a necessary, although not entirely sufficient, condition for a polymeric material to provide enhanced corrosion protection when used in conjunction with those materials. In order to evaluate a polymer's ability to prevent precipitation of phosphate and phosphonate salts, benchtop activity tests were initially employed (Tables I–III). A standard set of test conditions (10 ppm polymer actives 250 ppm $Ca^{+2}$, ppm $Mg^{+2}$, 10 ppm $PO_4$, pH 8.5 for 4 hrs.) is used initially to determine which polymers possess significant inhibitory activity (Table I). Additional results from low dosage tests (5 and 7.5 ppm polymer actives, Table I) determine which polymers may exhibit superior performance in later dynamic test conditions such as those provided in a Pilot Cooling Tower Test. All of the acrylic acid-based, derivatized polymers described herein exhibit good-to-excellent inhibition of calcium and magnesium phosphate salts. In almost every case, the new derivatized polymers possess performance which is superior to that observed from other polymers currently employed in commercial water treatment programs. The derivatized maleic acid-containing polymers often exhibit lower activity than their acrylic acid-based counterparts. However, good-to-excellent inhibition activity was generally observed at 10 or 20 ppm polymer actives of maleic acid-containing polymers (Table II). In order to evaluate the ability of a polymer sample to resist the negative effects of soluble iron, a species commonly encountered in industrial systems. The calcium and magnesium phosphate inhibition test (Table III) was employed with 10 ppm polymer actives and 3 ppm of soluble iron initially present. Again, the derivatized polymers commonly exhibited activity which is comparable to or superior to other commercially available polymers.

Test Procedure for Calcium and Magnesium Phosphate Inhibition

Calcium and magnesium were added to provide initial concentrations of 250 and 125 ppm. An equal amount of phosphate was added to each test solution, and the inhibitor concentrations are listed in Tables I and II. The temperature of the test solutions was maintained at 158° F. (70° C.). Using dilute aqueous NaOH, the pH was slowly increased to 8.5 and maintained during the four hour duration of the test. Mineral solubility calculations indicate supersaturation values for calcium phosphate $>10,000$ and magnesium phosphate $>600$ were initially present and the system was under highly stressed conditions. At the conclusion of each test, each solution was filtered (0.45 μm) and the orthophosphate concentration was determined spectrophotometrically (700 nm) after formation of a blue phosphomolybdate complex.

The inhibition of calcium phosphate is determined as indicated below:

$$\% \text{ inhibition} = \frac{[\text{filtered} - \text{blank}]}{[\text{unfiltered} - \text{blank}]} \times 100. \quad \text{Equation 1}$$

where,
filtered sample = concentration of phosphate ion in filtrate in the presence of inhibitor after 4 hours.
initial sample = concentration of phosphate ion in test at solution time zero.
blank = concentration of phosphate ion in filtrate in absence of inhibitor after 4 hours.

Using the above test method, a number of polymer compositions were tested. The results are show below in Tables I and II.

TABLE I

CALCIUM AND MAGNESIUM PHOSPHATE INHIBITION WITH ACRYLIC ACID DERIVATIZED ACRYLAMIDE-CONTAINING POLYMERS

| SAMPLE | POLYMER COMPOSITION MOLE % | Mw | % PHOSPHATE SALT INHIBITION PPM POLYMER ACTIVE | | |
|---|---|---|---|---|---|
| | | | 5 | 7.5 | 10 |
| A | Acrylic Acid 50/Acrylamide 35/ Carboxypentylacrylamide 15 | 14100 | 8 | 94 | 98 |
| B | Acrylic Acid/Acrylamide/ N—(1,2-Dicarboxy)ethylacrylamide | 13500 | 8 | 89 | 100 |
| $C_1$ | Acrylic acid 95/ Sulfoethylacrylamide 5 | 34800 | 32 | 92 | 98 |
| $C_2$ | Acrylic acid 79/Sulfoethyl- acrylamide 21 | 5800 | | 60 | 95 |
| $C_3$ | Acrylic acid 84/Sulfoethyl- acrylamide 16 | 31300 | 7 | 90 | 97 |
| $C_4$ | Acrylic acid 52/Acrylamide 40/ Sulfoethylacrylamide 7 | 45300 | 70 | | 93 |
| $C_5$ | Acrylic Acid 50/Acrylamide 35/ Sulfoethylacrylamide 15 | 5700 | 9 | 16 | — |
| $C_6$ | Acrylic acid 50/Acrylamide 31/ | 56000 | 95 | 99 | |

TABLE I-continued
CALCIUM AND MAGNESIUM PHOSPHATE INHIBITION WITH ACRYLIC ACID DERIVATIZED ACRYLAMIDE-CONTAINING POLYMERS

| | POLYMER COMPOSITION MOLE % | Mw | % PHOSPHATE SALT INHIBITION PPM POLYMER ACTIVE | | |
|---|---|---|---|---|---|
| | | | 5 | 7.5 | 10 |
| $C_7$ | Acrylic acid 34/Acrylamide 54/Sulfoethylacrylamide 18 | 43200 | 91 | | 99 |
| $C_8$ | Acrylic acid 23/Acrylamide 19/Sulfoethylacrylamide 11 | 28600 | 97 | | 93 |
| $C_9$ | Acrylic acid 19/Acrylamide 27/Sulfoethylacrylamide 58 | 44100 | 97 | | 99 |
| D | Acrylic Acid 75/Acrylamide 15/N—(2-Methyl-1,3-dihydroxy)-propyl acrylamide 10 | 16000 | | 23 | 82 |
| $E_1$ | Acrylic Acid 95/Sulfomethyl-Acrylamide 5 | 18000 | | 100 | 95 |
| $E_2$ | Acrylic Acid 69/Acrylamide 17/Sulfomethylacrylamide 14 | 19600 | 43 | 98 | 100 |
| $E_3$ | Acrylic Acid 52/Acrylamide 27/Sulfomethylacrylamide 21 | 7500 | 32 | | 84 |
| $E_4$ | Acrylic Acid 37/Acrylamide 23/Sulfomethylacrylamide 41 | 81700 | 94 | 96 | 94 |
| $E_5$ | Acrylic Acid 23/Acrylamide 73/Sulfomethylacrylamide 4 | 71200 | 55 | | 92 |
| $E_6$ | Acrylic Acid 13/Acrylamide 78/Sulfomethylacrylamide 9 | 67600 | 88 | | 91 |
| F | Acrylic Acid 51/Acrylamide 32/N—(2,3-Dihydroxy)propyl-acrylamide 17 | 14600 | 10 | 75 | 98 |
| G | Acrylic Acid 45/Acrylamide 45/Sulfophenylacrylamide 10 | 11500 | 7 | 90 | 97 |
| $H_1$ | Acrylic Acid 80/Acrylamide 5/2-Hydroxy-3-sulfopropyl-acrylamide 15 | 36500 | 12 | 45 | 100 |
| $H_2$ | Acrylic Acid 40/Acrylamide 30/2-Hydroxy-3-sulfopropyl-acrylamide 30 | 21700 | | | 63 |
| I | Acrylic Acid 45/Acrylamide 50/tris-(hydroxymethyl)methylacrylamide 5 | 11600 | | | 99 |
| Commercial Examples | | | | | |
| J | Acrylic Acid 68/Methacrylic Acid 19/t-Butylacrylamide 13 | 15600 | 60 | 77 | 84 |
| K | Acrylic Acid 75/Hydroxypropylacrylate 25 | 7400 | 13 | | 50 |
| L | Maleic Acid 25/Sulfonated Styrene 75 | 19000 | 8 | 74 | 84 |

TABLE II
CALCIUM AND MAGNESIUM PHOSPHATE INHIBITION WITH MALEIC ANHYDRIDE-CONTAINING POLYMERS DERIVATIZED WITH FUNCTIONALIZED AMINOARYL(ALKYL) GROUPS

| SAMPLE | POLYMER COMPOSITION* AND MOLE RATIO ANHYDRIDE GROUP:AMINE | Mw | % PHOSPHATE SALT INHIBITION P.P.M. POLYMER ACTIVES | |
|---|---|---|---|---|
| | | | 10 | 20 |
| BB | Maleic Anhydride/Methyl Vinyl Ether + Sodium Taurate (1:1) | 3900 | 96 | |
| CC | Maleic Anhydride/Methyl Vinyl Ether + Sodium Taurate (1:1) | 32800 | 82 | |
| DD | Maleic Anhydride/Methyl Vinyl Ether + Sodium Taurate (1:0.5) | 41600 | 19 | 50 |
| EE | Gantrez AN-149 + Sodium Taurate (1:1) | 98900 | 56 | 83 |
| FF | Maleic Anhydride/Hexene + Sodium Taurate (1:0.5) | 37300 | 11 | 69 |
| GG | Maleic Anhydride/Acrylamide + Sodium Taurate (1:1) | 8300 | 17 | 98 |
| HH | Maleic Anhydride/Methyl Vinyl Ether + 4-aminophenol (1:1) | 6700 | 10 | |
| II | Gantrez AN-149 + Sodium Sulfanilate (1:0.5) | 28000 | 84 | |
| JJ | Gantrez AN-149 + Sodium Sulfanilate (1:1) | 95400 | 63 | 80 |

TABLE II-continued
CALCIUM AND MAGNESIUM PHOSPHATE INHIBITION WITH MALEIC ANHYDRIDE-CONTAINING POLYMERS DERIVATIZED WITH FUNCTIONALIZED AMINOARYL(ALKYL) GROUPS

| SAMPLE | POLYMER COMPOSITION* AND MOLE RATIO ANHYDRIDE GROUP:AMINE | Mw | % PHOSPHATE SALT INHIBITION P.P.M. POLYMER ACTIVES 10 | 20 |
|---|---|---|---|---|
| KK | Gantrez AN-119 + Sodium Sulfanilate (1:0.67) | 9800 | 16 | 92 |
| LL | SMA-1000 + Sodium Sulfanilate (1:0.67) | 6600 | 22 | 95 |
| MM | SMA-3000 + Sodium Sulfanilate (1:1) | 11000 | 21 | 90 |
| NN | Gantrez AN-149 + 4-Aminophenyl-sulfonic acid (1:1) | 28000 | 84 | |
| OO | Gantrez AM-119 + Methylbutyl-amine (1:0.67) | 69200 | 38 | |

*Abbreviations are as follows: SMA-1000 or 3000 (ARCO) styrene-maleic anhydride copolymer; Gantrez AN-119 and Gantrez AN-149 (GAF) are maleic anhydride-methyl vinyl ether copolymers differing only in molecular weight.

Phosphate Salt Inhibition in Presence of Iron

The test procedure is identical to the method previously described for calcium and magnesium phosphates, except that 3 ppm of soluble iron (II) and 10 ppm of polymeric inhibitor are added. Equation 1 is used for determining percent scale inhibition, as previously stated. The presence of iron applies additional stress upon the polymeric material and the percent inhibition values usually decrease significantly. As polymer effectiveness increases, the decline in percent inhibition is minimized.

Results obtained for co- and terpolymers are listed below in Table III. The Table III results may be compared with the percent inhibition results of Table I (10 ppm polymer actives).

TABLE III
PHOSPHATE SALT INHIBITION IN PRESENCE OF IRON-CONTAINING SPECIES

| SAMPLE | MOLECULAR WEIGHT, Mw | % PHOSPHATE* SALT INHIBITION (3 P.P.M. SOLUBLE IRON ADDED) |
|---|---|---|
| A | 14100 | 88 |
| B | 13500 | 35 |
| $C_1$ | 34800 | 4 |
| $C_2$ | 5800 | 23 |
| $C_3$ | 31300 | 8 |
| $C_4$ | 45300 | 96 |
| $C_5$ | 5700 | 9 |
| $C_6$ | 56000 | 97 |
| $C_7$ | 43200 | 74 |
| $C_8$ | 28600 | 96 |
| $C_9$ | 44100 | 89 |
| D | 16000 | 22 |
| $E_1$ | 18000 | 98 |
| $E_2$ | 19600 | 28 |
| $E_3$ | 7500 | 97 |
| $E_4$ | 81700 | 93 |
| $E_5$ | 71200 | 57 |
| $E_6$ | 67600 | 50 |
| F | 14600 | 10 |
| $H_1$ | 36500 | 8 |
| $H_2$ | 21700 | 33 |
| Commercial Example | | |
| J | 15600 | 6 |
| K | 7400 | 11 |
| L | 19000 | 48 |

*At polymer dosage level of 10 ppm actives.

Pilot Cooling Tower Tests

The pilot cooling tower test is a dynamic test which simulates may features present in an industrial recirculating the article "Small-Scale Short-Term Methods of Evaluating Cooling Water Treatments . . . Are they worthwhile?", by D. T. Reed and R. Nass, Minutes of the 36th Annual Meeting of the INTERNATIONAL WATER CONFERENCE, Pittsburgh, Pa., Nov. 4–6, 1975. The general operating conditions are listed below in Table IV.

TABLE IV

| Concentration cycles* | 3.7–4.0 |
|---|---|
| Basin Temperature | 100° F. |
| Holding Time Index | 24 hr. |
| Flow Rate | 2 gpm |
| pH | 7.0 |
| Test Duration | 14 days |

*At 4 cycles, the ion concentrations (as $CaCO_3$) are: 360 ppm $Ca^{+2}$, 200 ppm $Mg^{+2}$, 360 ppm $Cl^-$, and 200 ppm sulfate.

At the beginning of each pilot cooling tower test, the mass of each heat-exchange tube was determined. After each test was completed, the tubes were dried in an oven and reweighed. Next, the tubes were cleaned with inhibited acid (dilute HCl and formaldehyde), dried, and the final weight determined. Those three weights were used to determine ratios of deposition (mg/day) and corrosion (mils per year).

As the performance of the treatment program and polymeric inhibitor increases, the corrosion and deposit rates decrease. Average mild steel corrosion rates are considered equivalent when differences of >0.5 mpy are observed. The pilot cooling tower results are listed in Table V. Based on experience and field applications, acceptable mild steel corrosion and deposit rates in pilot cooling tower tests are ≦3.0 mpy and ≦35 mg/day, respectively.

TABLE V
Pilot Cooling Tower Tests (pH 7)

| Polymer Sample | Polymer Dosage (ppm Actives) | Average Deposit-Mild Steel (mg/day) | Average Corrosion-Mild Steel (mpy) |
|---|---|---|---|
| Blank | — | 89 | 4.1 |
| $C_3$ | 2.5 | 32 | 3.0 |
| $C_3$ | 6.6 | 10 | 1.5 |
| $E_2$ | 6.6 | 16 | 2.3 |

TABLE V-continued

| Pilot Cooling Tower Tests (pH 7) | | |
| --- | --- | --- |
| Polymer Dosage (ppm Actives) | Average Deposit-Mild Steel (mg/day) | Average Corrosion-Mild Steel (mpy) |
| Commercial Examples | | |
| J  6.6 | 31 | 2.2 |
| K  6.6 | 47 | 2.9 |
| L  11 | 27 | 2.2 |

Each polymer sample was used in combination with ortho/pyrophosphate and phosphonate. The feed rate of the phosphorus-containing species was equivalent to 100 ppm feed of formulation Example 8. Very poor control of mild steel corrosion and deposit was observed when no polymeric inhibitor was employed (polymer sample "blank"). By employing polymers of this invention (polymer samples $C_3$ and $E_2$), good-to-excellent control of mild steel corrosion and deposits was obtained which is superior to other very effective polymers. In particular, 6.6 ppm dosage of polymer $C_3$ or $E_2$ provides equal or better performance than 11 ppm dosage of AA/HPA polymer (a.k.a. Natrol 42, Narlex LD-42), a polymer commonly utilized in phosphate-based programs. The ability of the derivatized polymers of this invention to function at unusually low dosage was demonstrated by the acceptable control of mild steel corrosion and deposit from feeding only 2.5 ppm actives of polymer sample $C_2$.

Therefore we claim:

1. A method for improving the performance of corrosion inhibitors in aqueous systems having hardness and a pH of at least 6.5 by dosing said system with:

From 10–50 ppm of a composition comprising:

I. a water-soluble inorganic phosphate capable of inhibiting corrosion in an aqueous alkaline environment, and II. an N-substituted acrylamide polymer from the group consisting of 2-acrylamidoethane sulfonic acid/acrylic acid, 2-acrylamidoethane sulfonic acid/acrylic acid/acrylamide and acrylamidomethane sulfonic acid/acrylic acid/acrylamide with the weight ratio of polymer:phosphate being within the range of 0.1:1 to 5:1.

2. The method of claim 1, wherein said composition further includes a water-soluble organic phosphonate with the weight ratio of inorganic phosphate to organic phosphonate being within the range of 0.5:1 to 2:1.

3. The method of claim 1 or claim 2 wherein the polymer is an acrylic acid/acrylamide/sulfomethylacrylamide polymer having a mole ratio of acrylic acid to acrylamide to sulfomethylacrylamide polymer within the range of 13–95 to 0–73 to 5–41 respectively; and wherein the polymer has a weight average molecular weight within the range of 7,000–82,000.

4. The method of claim 3, wherein the polymer has a mole ratio of acrylic acid to acrylamide to sulfomethylacrylamide within the range of 40–90 t 0–50 to 10–40 respectively; and wherein the polymer has a weight average molecular weight within the range of 10,000–40,000.

5. The method of claim 1 or claim 2 wherein the polymer is an acrylic acid/acrylamide/2-sulfoethylacrylamide polymer having a mole ratio of acrylic acid to acrylamide to 2-sulfoethylacrylamide within the range of 19–95 to 0–54 to 5–58 respectively; and wherein the polymer has a weight average molecular weight within the range of 6,000–56,000.

6. The method of claim 15 wherein the polymer has a mole ratio of acrylic acid to acrylamide to 2-sulfoethylacrylamide within the range of 40–90 to 0–50 to 10–40 respectively; and wherein the polymer has a weight average molecular weight within the range of 10,000–40,000.

* * * * *

UNITED STATES PATENT AND TRADEMARK OFFICE
CERTIFICATE OF CORRECTION

PATENT NO. : 4,752,443

DATED : JUNE 21, 1988

INVENTOR(S) : JOHN E. HOOTS, DONALD A. JOHNSON, DODD W. FONG AND JAMES F. KNELLER

It is certified that error appears in the above-identified patent and that said Letters Patent is hereby corrected as shown below:

Column 22, Line 24, Claim 4 thylacrylamide within the range of 40-90 t 0-50 to

"LETTERS PATENT SHOULD READ AS:"

thylacrylamide within the range of 40-90 to 0-50 to

Column 22, Line 35, Claim 6

6. The method of claim 15 wherein the polymer has a

"LETTERS PATENT SHOULD READ AS:"

6. The method of claim 5 wherein the polymer has a

Signed and Sealed this

First Day of November, 1988

Attest:

DONALD J. QUIGG

Attesting Officer

Commissioner of Patents and Trademarks